United States Patent
Bae et al.

(10) Patent No.: US 8,483,201 B2
(45) Date of Patent: Jul. 9, 2013

(54) SERVER, TERMINAL AND METHOD FOR END TO END CHANNEL CAPACITY ESTIMATION IN HIGH SPEED DOWNLINK PACKET ACCESS NETWORK

(75) Inventors: Seong-Jun Bae, Daejeon (KR); Jeong Ju Yoo, Daejeon (KR); Jin-Woo Hong, Daejeon (KR); Sung Jea Ko, Seoul (KR); Hye Soo Kim, Seoul (KR); Hyeong Min Nam, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 377 days.

(21) Appl. No.: 12/808,133

(22) PCT Filed: Dec. 15, 2008

(86) PCT No.: PCT/KR2008/007402
§ 371 (c)(1),
(2), (4) Date: Aug. 31, 2010

(87) PCT Pub. No.: WO2009/078635
PCT Pub. Date: Jun. 25, 2009

(65) Prior Publication Data
US 2010/0322224 A1   Dec. 23, 2010

(30) Foreign Application Priority Data
Dec. 14, 2007   (KR) .................. 10-2007-0131066

(51) Int. Cl.
*H04B 7/216*   (2006.01)
(52) U.S. Cl.
USPC ......................................................... 370/342

(58) Field of Classification Search
USPC .................. 370/230–235, 252, 328–339, 342
See application file for complete search history.

(56) References Cited

U.S. PATENT DOCUMENTS 6,813,244 B1 * 11/2004 He et al. ......................... 370/235
7,133,368 B2 * 11/2006 Zhang et al. ................... 370/249

(Continued)

FOREIGN PATENT DOCUMENTS

KR   1020040028039   4/2004
KR   1020040058032   7/2004

(Continued)

OTHER PUBLICATIONS

Naudts, A Wireless Mesh Monitoring and Planning Tool for Emergency Services, IEEE, 6 pages, 2007.*

(Continued)

*Primary Examiner* — Frank Duong
(74) *Attorney, Agent, or Firm* — Nelson Mullins Riley & Scarborough LLP; EuiHoon Lee, Esq.

(57) ABSTRACT

A server and a terminal enabling channel capacity estimation in a High-Speed Downlink Packet Access (HSDPA) network and a method of controlling the server and the terminal are provided. More particularly, when transmitting data between both terminals in an HSDPA network, a server end may transmit a packet pair of the same size and a client end may measure a time difference between the packet pair and thereby proceed filtering. Through this, it is possible to estimate the channel capacity. Therefore, it is possible to prevent data transmission from exceeding the channel capacity in the HSDPA to thereby prevent a packet loss and to effectively use a channel.

10 Claims, 6 Drawing Sheets

U.S. PATENT DOCUMENTS

| | | | | |
|---|---|---|---|---|
| 7,188,172 | B2 * | 3/2007 | del Val et al. | 709/224 |
| 7,558,202 | B2 * | 7/2009 | Luo et al. | 370/232 |
| 2003/0152034 | A1 | 8/2003 | Zhang et al. | |
| 2007/0025548 | A1 | 2/2007 | Zheng et al. | |

FOREIGN PATENT DOCUMENTS

| | | |
|---|---|---|
| KR | 1020060056495 | 5/2006 |
| KR | 1020060059838 | 6/2006 |
| KR | 1020070061687 | 6/2007 |

OTHER PUBLICATIONS

Nam et al, Probing Based Wireless Channel Bandwidth Estimation and Its Application to Video Streaming Over Wireless Networks, IEEE, 6 pages, Apr. 2008.*

Hu et al, Estimating Available Bandwidth Using Packet Pair Probing, Carnegie Mellon University, 28 pages, Sep. 2002.*

* cited by examiner

TERMINAL 140

SERVER 110

| | 710 | 720 | 730 | 740 |
|---|---|---|---|---|
| 700 | AVERAGE CHANNEL CAPACITY VALUE E(Kbps) | MEASURED ACTUAL CAPACITY VALUE B(Kbps) | ESTIMATED CHANNEL CAPACITY VALUE $C_{Estimated}$ =1.5955E-560.35 (Kbps) | ERROR BETWEEN ACTUAL VALUE & ESTIMATED VALUE e = B-E(Kbps) |
| | 1055.95 | 1200.25 | 1124.41 | 75.82 |
| | 1000.02 | 952.514 | 1035.18 | -82.67 |
| | 893.99 | 857.60 | 866.01 | -8.42 |
| | 865.64 | 739.82 | 820.78 | -80.97 |
| | 689.54 | 451.04 | 539.82 | -88.78 |
| | 581.08 | 400.55 | 366.76 | 33.80 |
| | 558.25 | 319.15 | 330.33 | -11.12 |
| | 382.66 | 109.51 | 50.18 | 59.32 |

SERVER, TERMINAL AND METHOD FOR END TO END CHANNEL CAPACITY ESTIMATION IN HIGH SPEED DOWNLINK PACKET ACCESS NETWORK

RELATED APPLICATIONS

This application is a 35 U.S.C. §371 national stage filing of PCT Application No. PCT/KR2008/007402 filed on Dec. 15, 2008, which claims priority to, and the benefit of, Korean Patent Application No. 10-2007-0131066 filed on Dec. 14, 2007. The contents of the aforementioned applications are hereby incorporated by reference.

TECHNICAL FIELD

The present invention relates to a server and a terminal enabling channel capacity estimation in a High-Speed Downlink Packet Access (HSDPA) network and a method of controlling the server and the terminal. More particularly, the present invention relates to a channel capacity estimation method and system in an HSDPA network in which a client end may estimate the capacity of a current channel using a data packet transmitted from a server end of an HSDPA network.

This work was supported by the IT R&D program of MIC/IITA. [2005-S-103-03, Development of Ubiquitous Access Technology for Convergence of Broadcasting and Communications]

BACKGROUND ART

A High-Speed Downlink Packet Access (HSDPA) network denotes a 3.5 generation mobile communication scheme that can transmit and receive data via an HSDPA much more quickly than Code Division Multiple Access (CDMA) or Wideband Code Division Multiple Access (WCDMA) corresponding to 3rd mobile communication technology.

In the HSDPA network, when data communication is being performed between both terminals, a current channel capacity should be verified in order to prevent packet loss that may occur due to exceeding of the channel capacity and to effectively use a channel.

In the case of a channel capacity estimation algorithm between both terminals in an existing Internet Protocol (IP) network, a server end may transmit a data packet and an additional probing packet. A client end may receive the probing packet and analyze the received probing packet. Therefore, the channel capacity estimation algorithm may be used to estimate the channel capacity in a wired IP network with a relatively greater bandwidth in comparison to a wireless network.

In the channel capacity estimation algorithm, the additional probing packets use a channel in the wireless network with a less channel capacity, which results in reducing an available channel capacity of an actual data packet.

DISCLOSURE OF INVENTION

Technical Problem

An aspect of the present invention provides a channel capacity estimation method and system in a High-Speed Downlink Packet Access (HSDPA) network in which a server end may transmit a pair of data packets of the same size and filter the data packets appropriate for an HSDPA network, and a client end can receive the data packets, measure a time difference between the received data packets, and thereby estimate the channel capacity, in order to obtain the channel capacity between both terminals in the HSDPA network.

Technical Solution

According to an aspect of the present invention, there is provided a method of controlling a terminal enabling channel capacity estimation in a High-Speed Downlink Packet Access (HSDPA) network, including: receiving two packets of the same size that are consecutively transmitted via a channel without causing time latency; measuring a received time difference between the two packets; dividing the length of any one packet of the two packets by the time difference to calculate a channel capacity value; calculating an average channel capacity value based on a plurality of channel capacity values; and estimating the channel capacity based on a plurality of average channel capacity values.

In this instance, the method may further include filtering a channel capacity value greater than a maximum data throughput per second in the HSDPA network, among the plurality of channel capacity values.

Also, the maximum data throughput per second may be 1.8 Mbps.

According to another aspect of the present invention, there is provided a method of controlling a server enabling channel capacity estimation in an HSDPA network, including: consecutively transmitting two packets of the same size via a channel without causing time latency; receiving, from a terminal that receives the two packets, information associated with a time difference between the two received packets; dividing the length of any one packet of the two packets by the time difference to calculate a channel capacity value; calculating an average channel capacity value based on a plurality of channel capacity values; and estimating the channel capacity based on a plurality of average channel capacity values.

In this instance, the method may further include filtering a channel capacity value greater than a maximum data throughput per second in the HSDPA network, among the plurality of channel capacity values.

According to still another aspect of the present invention, there is provided a terminal enabling channel capacity estimation in an HSDPA network, including: a receiver configured to receive two packets of the same size that are consecutively transmitted via a channel without causing time latency; a time difference measuring unit configured to measure a received time difference between the two received packets; a channel capacity calculator configured to divide the length of any one packet of the two packets by the time difference and thereby calculate a channel capacity value, and to calculate an average channel capacity value based on a plurality of channel capacity values; and a channel capacity estimator configured to estimate the channel capacity based on a plurality of average channel capacity values.

In this instance, the terminal may further include a filter configured to filter a channel capacity value greater than a maximum data throughput per second in the HSDPA network, among the plurality of channel capacity values.

According to yet another aspect of the present invention, there is provided a server enabling channel capacity estimation in an HSDPA network, including: a transmitter configured to consecutively transmit two packets of the same size via a channel without causing time latency; a receiver configured to receive, from a terminal that receives the two packets, information associated with a time difference between the two received packets; a channel capacity calculator configured to divide the length of any one packet of the two packets by the time difference and thereby calculate a channel capacity value, and to calculate an average channel capacity value based on a plurality of channel capacity values; and a channel capacity estimator configured to estimate the channel capacity based on a plurality of average channel capacity values.

In this instance, the server may further include a filter configured to filter a channel capacity value greater than a maximum data throughput per second in the HSDPA network, among the plurality of channel capacity values.

MODE FOR THE INVENTION

Figure 1:
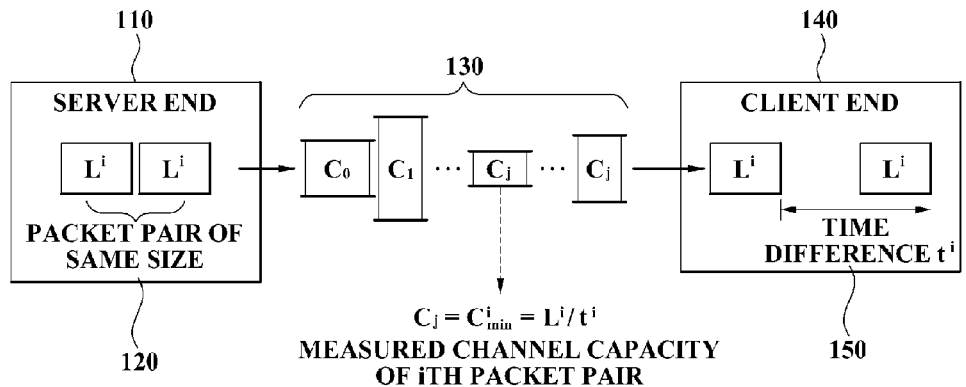
FIG. 1 illustrates an example of channel capacity estimation according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates an example of channel capacity estimation according to an embodiment of the present invention. The channel capacity may be measured using a packet pair in a wired Internet Protocol (IP) network.

As shown in FIG. 1, in the wired IP network, when j+1 sections 130 with channel capacity, $C_o, \ldots, C_j$, exist and a section with the minimum channel capacity is $C_{min}$, a server end 110 may transmit a packet pair 120 without time interval. A client end 140 may receive the packet pair 120 and obtain a time difference $t^i$ 150 between the packet pair.

When using the above-described packet pair probing technique, the minimum channel capacity $C_{min}$ may be obtained in some section between the server end 110 and the client end 140.

In a general wireless communication, a section with the least channel capacity is a wireless section between a base station and a terminal rather than a wired section on the Internet. Therefore, in a High-Speed Downlink Packet Access (HSDPA) network, a section between a base station and an HSDPA terminal may have the least channel capacity.

The least channel capacity $C^i_{min}$ in the wired IP network that is obtained from the received packet pair 120 may be calculated according to, $$C^i_{min} = L^i/t^i, \qquad \text{[Equation 1]}$$

where $L^i$ denotes the length of any one packet of the received packet pair 120.

When using Equation 1, it is possible to estimate the least channel capacity between the server and the terminal in the HSDPA network.

In the commercialized HSDPA network, the logical maximum data throughput per second is 1.8 Mbps. Therefore, it is possible to filter a channel capacity value greater than 1.8 Mbps among all the calculated channel capacity values using Equation 1 and thereby remove the channel capacity value.

When the server end 110 transmits a total of 'N' packets and in this instance, the average channel capacity value is 'E', the estimated channel capacity $C_{Estimated}$ may be calculated according to, $$C_{Estimated} = a \times E + b, \qquad \text{[Equation 2]}$$

$$C_{Estimated} = ae^{b \cdot E}. \qquad \text{[Equation 3]}$$

Here, a and b may be experimentally obtained.

Equation 2 represents the actual channel capacity $C_{Estimated}$ as a linear model and Equation 3 represents the actual channel capacity $C_{Estimated}$ as an index model.

Figure 2:
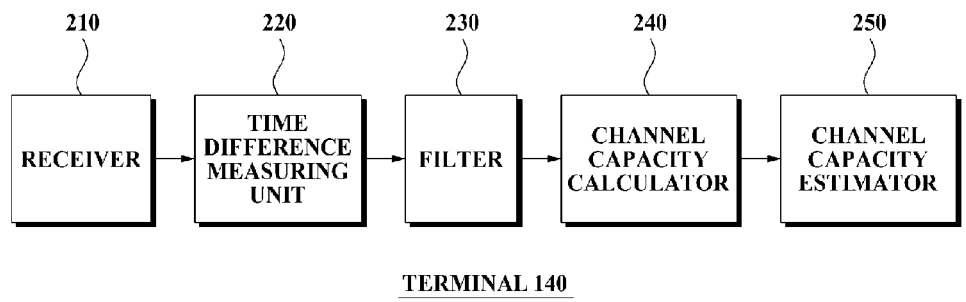
FIG. 2 is a block diagram illustrating a configuration of a terminal enabling channel capacity estimation in a High-Speed Downlink Packet Access (HSDPA) network according to an embodiment of the present invention.

FIG. 2 is a block diagram illustrating a configuration of a terminal 140 enabling channel capacity estimation in an HSDPA network according to an embodiment of the present invention.

As shown in FIG. 2, the terminal 140 includes a receiver 210, a time difference measuring unit 220, a filter 230, a channel capacity calculator 240, and a channel capacity estimator 250.

The receiver 210 may receive two packets of the same size that are consecutively transmitted via a channel without causing time latency.

The time difference measuring unit 220 may measure a time difference between the two received packets.

The filter 230 may filter a channel capacity value greater than a maximum data throughput per second in the HSDPA network, among a plurality of channel capacity values. Based on that the maximum data throughput per second is 1.8 Mbps, the filter 230 may filter and remove the channel capacity value greater than 1.8 Mbps.

The channel capacity calculator 240 may divide the length of any one packet of the two packets by the time difference and thereby calculate a channel capacity value. Also, the channel capacity calculator 240 may calculate an average channel capacity value based on a plurality of channel capacity values.

The channel capacity estimator 250 may estimate the channel capacity based on a plurality of average channel capacity values.

Figure 3:
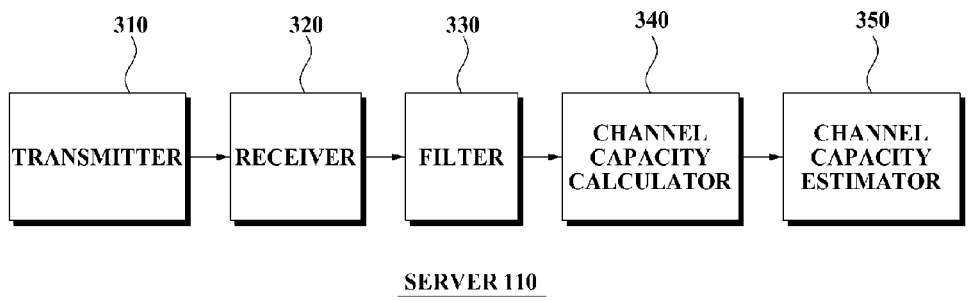
FIG. 3 is a block diagram illustrating a configuration of a server enabling channel capacity estimation in an HSDPA network according to an embodiment of the present invention.

FIG. 3 is a block diagram illustrating a configuration of a server 110 enabling channel capacity estimation in an HSDPA network according to an embodiment of the present invention. Hereinafter, the server 110 will be described with reference to FIG. 3.

As shown in FIG. 3, the server 110 includes a transmitter 310, a receiver 320, a filter 330, a channel capacity calculator 340, and a channel capacity estimator 350.

The transmitter 310 may consecutively transmit two packets of the same size via a channel without causing time latency.

The receiver 320 may receive information associated with a time difference between the two received packets from a terminal that receives the two packets.

The filter 330 may filter a channel capacity value greater than a maximum data throughput per second in the HSDPA network, among a plurality of channel capacity values. Based on that the maximum data throughput per second is 1.8 Mbps, the filter 330 may filter and remove the channel capacity value greater than 1.8 Mbps.

The channel capacity calculator 340 may divide the length of any one packet of the two packets by the time difference and thereby calculate a channel capacity value. The channel capacity calculator 340 may calculate an average channel capacity value based on a plurality of channel capacity values.

The channel capacity estimator 350 may estimate the channel capacity based on a plurality of average channel capacity values.

Figure 4:
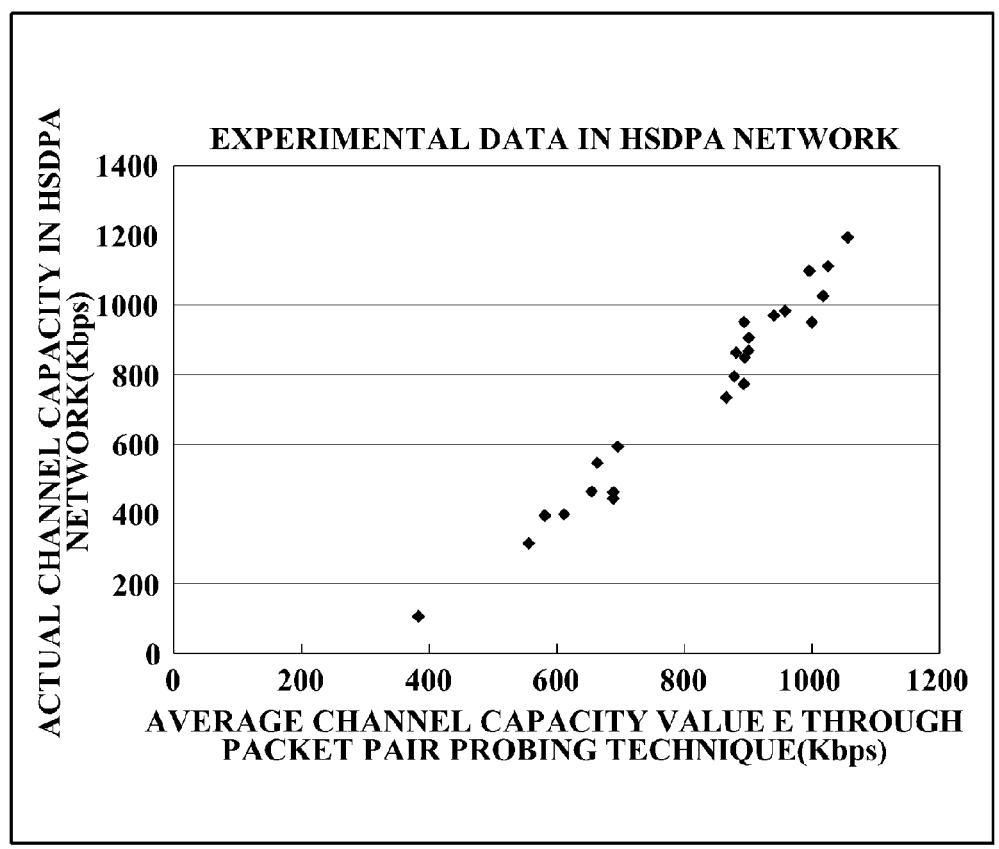
FIG. 4 is a graph illustrating an experimental result for channel capacity estimation in an HSDPA network according to an embodiment of the present invention.

FIG. 4 is a graph illustrating an experimental result for channel capacity estimation in an HSDPA network according to an embodiment of the present invention. Specifically, FIG. 4 illustrates the actual experimental result for obtaining Equation 2 and Equation 3.

In FIG. 4, the horizontal axis denotes the average channel capacity value E that is obtained after filtering. The vertical axis denotes the actual channel capacity in the HSDPA network.

When obtaining a linear model of Equation 2 and an index model of Equation 3 from data of FIG. 4, they may be respectively given by, $$C_{Estimated} = 1.5955 \times E - 560.35 \text{ (Kbps)}, E \geq 380 \text{ (Kbps)}, \quad \text{[Equation 4]}$$

$$C_{Estimated} = 0.125 \times E \text{ (Kbps)}, E < 380 \text{ (Kbps)}$$

$$C_{Estimated} = 62.469 e^{0.0029E} \text{ (Kbps)}. \quad \text{[Equation 5]}$$

When using Equation 4 or Equation 5, it is possible to estimate the channel capacity $C_{Estimated}$.

Figure 5:
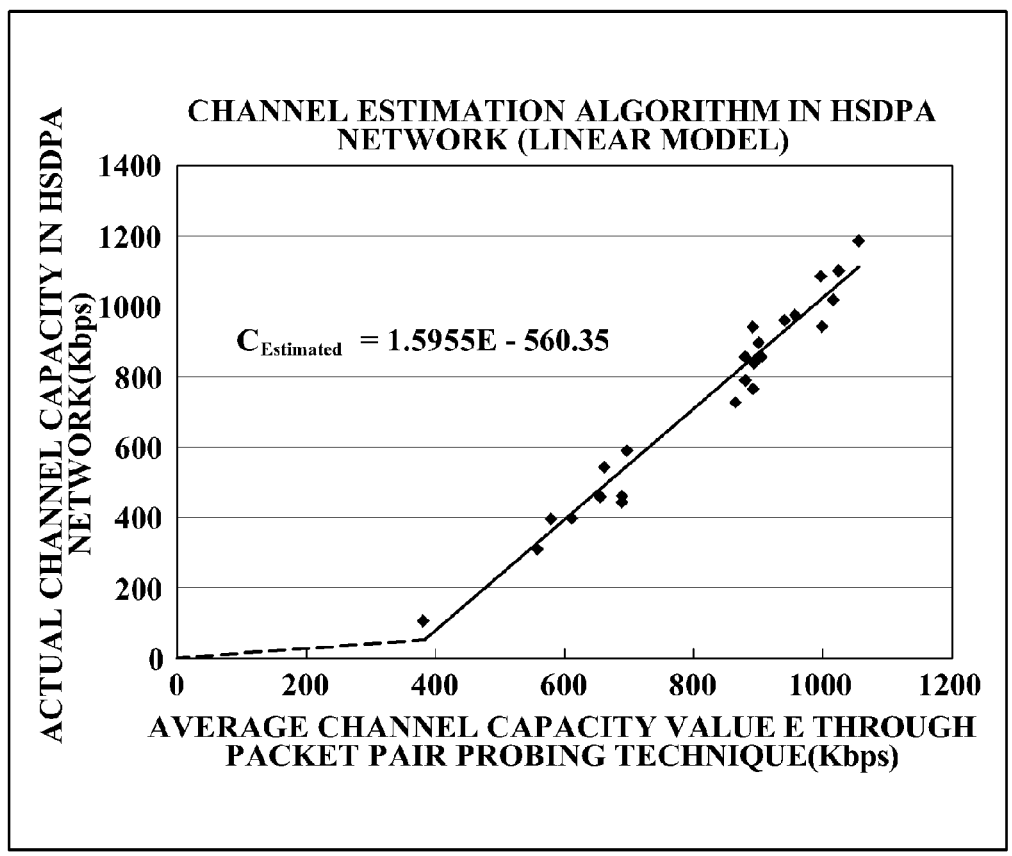
FIG. 5 is a graph illustrating an example of a linear model of channel capacity estimation according to an embodiment of the present invention.
Figures 6, 7:
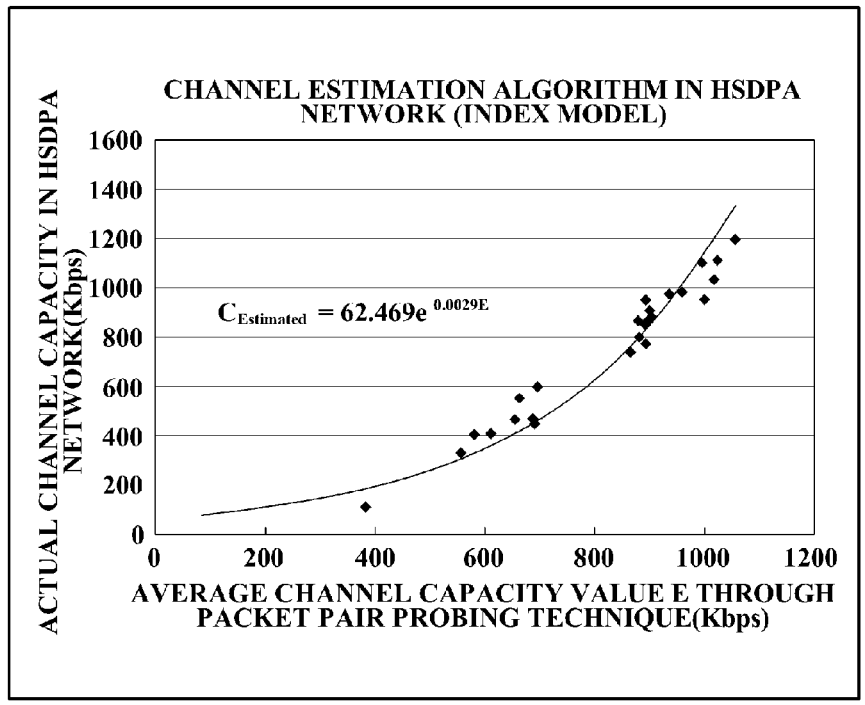
FIG. 6 is a graph illustrating an example of an index model of channel capacity estimation according to an embodiment of the present invention.
FIG. 7 is a table illustrating the estimated channel capacity and an error thereof according to an embodiment of the present invention.

FIG. 5 is a graph illustrating an example of a linear model of channel capacity estimation according to an embodiment of the present invention, and FIG. 6 is a graph illustrating an example of an index model of channel capacity estimation according to an embodiment of the present invention.

FIG. 5 represents Equation 4 as a graph. FIG. 6 represents Equation 5 as a graph. Specifically, it is possible to more appropriately induce the linear model of Equation 2 and the index model of Equation 3 from data of FIG. 4.

FIG. 7 is a table 700 illustrating the estimated channel capacity and an error thereof according to an embodiment of the present invention. Specifically, the table 700 includes an average channel capacity value E 710 using packet pair probing technique, a measured actual capacity value 720, an estimated channel capacity value 730, and an error between the measured actual capacity value 720 and the estimated channel capacity value 730.

The table 700 shows the average channel capacity value E 710 and the error between the measured actual channel capacity 720 and the estimated channel capacity value $C_{Estimated}$ 730 obtained from Equation 4 and Equation 5.

As shown in the table 700, the error between the measured actual capacity value 720 and the estimated channel capacity value 730 may be a maximum of about 90 Kbps. Therefore, it is possible to estimate the channel capacity within the error range to thereby transmit data.

Figure 8:
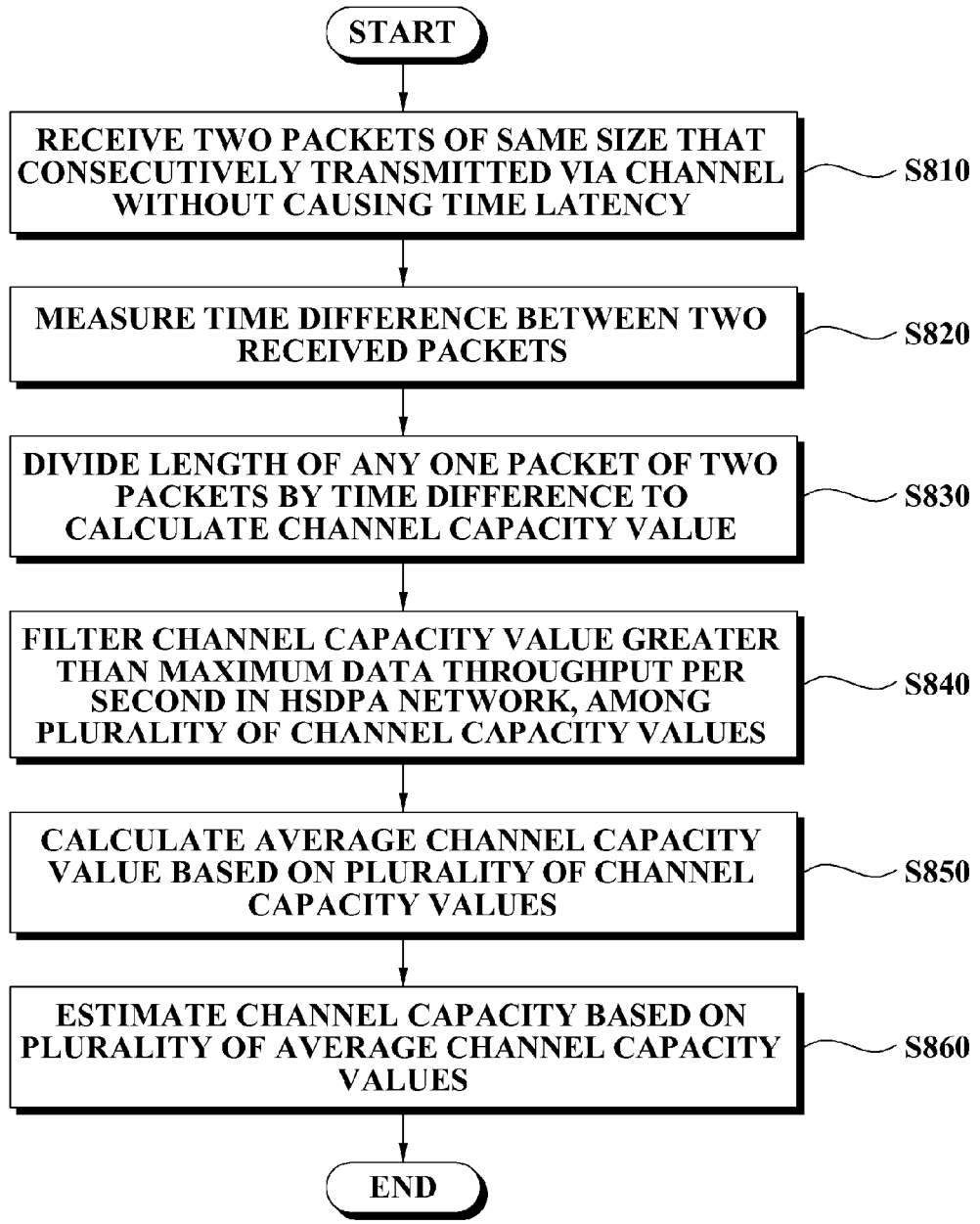
FIG. 8 is a flowchart illustrating a method of controlling a server enabling channel capacity estimation in an HSDPA network according to an embodiment of the present invention.

FIG. 8 is a flowchart illustrating a method of controlling a terminal enabling channel capacity estimation in an HSDPA network according to an embodiment of the present invention. Hereinafter, the controlling method of the terminal according to an embodiment of the present invention will be described with reference to FIG. 8.

In operation S810, the method may receive two packets of the same size that are consecutively transmitted via a channel without causing time latency. In operation S820, the method may measure a time difference between the two received packets.

In operation S830, the method may divide the length of any one packet of the two packets by the time difference to calculate a channel capacity value.

In operation S840, the method may filter a channel capacity value greater than a maximum data throughput per second in the HSDPA network, among a plurality of channel capacity values. According to an aspect of the present invention, it is possible to filter and remove the exceeding maximum data throughput per second based on 1.8 Mbps.

In operation S850, the method may calculate an average channel capacity value based on a plurality of channel capacity values.

In operation S860, the method may estimate the channel capacity based on a plurality of average channel capacity values.

Figure 9:
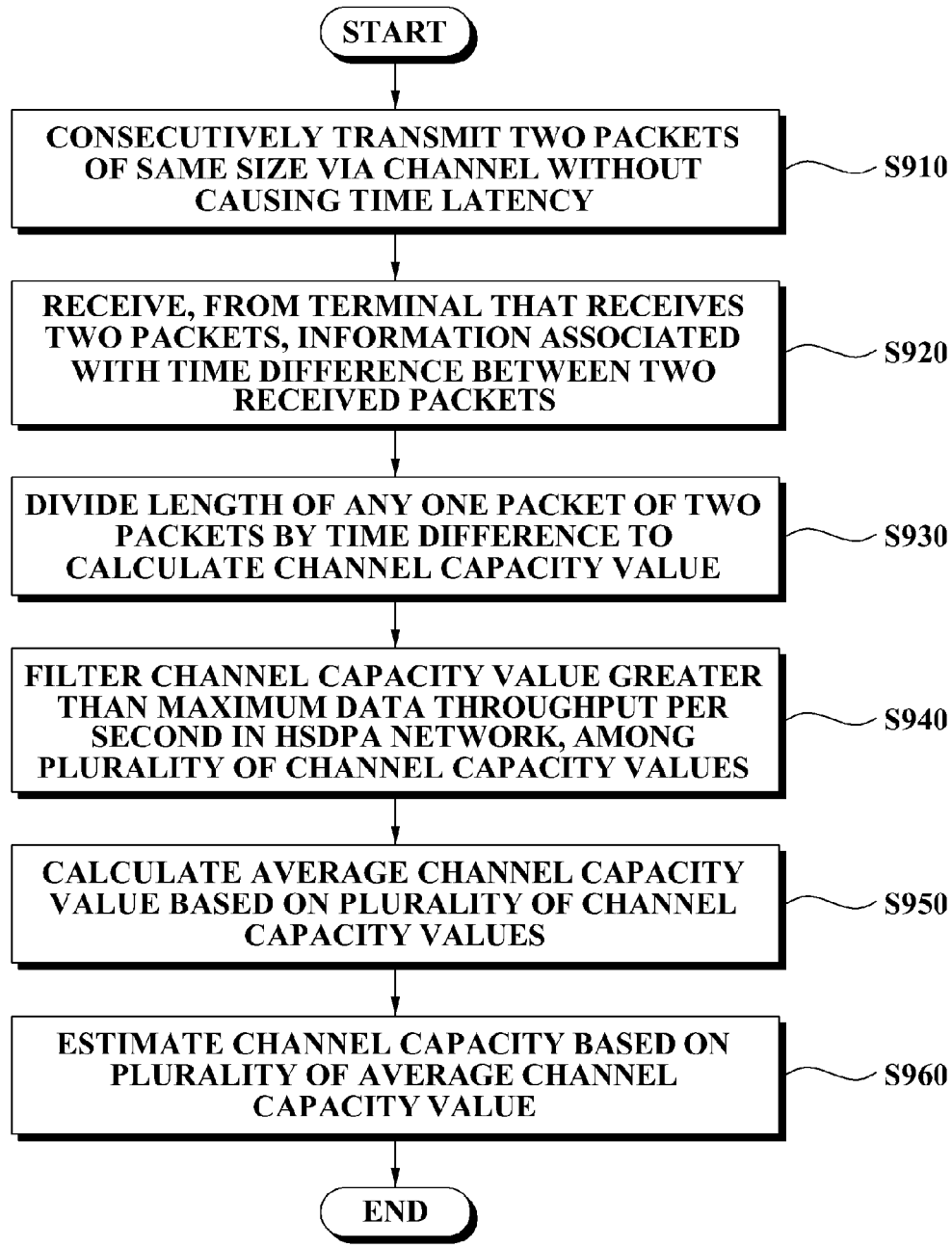
FIG. 9 is a flowchart illustrating a method of controlling a terminal enabling channel capacity estimation in an HSDPA network according to an embodiment of the present invention.

FIG. 9 is a flowchart illustrating a method of controlling a server enabling channel capacity estimation in an HSDPA network according to an embodiment of the present invention. Hereinafter, the controlling of the terminal will be described with reference to FIG. 9.

In operation S910, the method may consecutively transmit two packets of the same size via a channel without causing time latency.

In operation S920, the method may receive, from a terminal that receives the two packets, information associated with a time difference between the two received packets.

In operation S930, the method may divide the length of any one packet of the two packets by the time difference to calculate a channel capacity value.

In operation S940, the method may filter a channel capacity value greater than a maximum data throughput per second in the HSDPA network, among a plurality of channel capacity values. According to an aspect of the present invention, it is possible to filter and remove the exceeding maximum data throughput per second based on 1.8 Mbps.

In operation S950, the method may calculate an average channel capacity value based on a plurality of channel capacity values.

In operation S960, the method may estimate the channel capacity based on a plurality of average channel capacity values.

According to the present invention, it is possible to estimate the channel capacity between both terminals in an HSDPA network. Therefore, it is possible to prevent data transmission from exceeding the channel capacity in the HSDPA to thereby prevent a packet loss and to effectively use a channel.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of controlling a terminal enabling channel capacity estimation in a High-Speed Downlink Packet Access (HSDPA) network, comprising:
   receiving, by the terminal, two data packets of the same size that are consecutively transmitted via a channel without causing time latency;
   measuring a received time difference between the two packets;
   dividing the length of any one packet of the two packets by the time difference to calculate a channel capacity value;
   calculating an average channel capacity value based on a plurality of channel capacity values; and
   estimating the channel capacity based on a plurality of average channel capacity values,
   wherein a server transmits 'N' data packets to the terminal so that the plurality of channel capacity values are calculated from the 'N' packets, and the average channel capacity value is determined from the plurality of channel capacity values,
   wherein the 'N' packets comprises a plurality of two consecutively transmitted packets of the same size.

2. The method of claim 1, further comprising:
   filtering a channel capacity value greater than a maximum data throughput per second in the HSDPA network, among the plurality of channel capacity values.

3. The method of claim 2, wherein the maximum data throughput per second is 1.8 Mbps.

4. A method of controlling a server enabling channel capacity estimation in an HSDPA network, comprising:
   consecutively transmitting two data packets of the same size via a channel without causing time latency;
   receiving, from a terminal that receives the two packets, information associated with a time difference between the two received packets;
   dividing the length of any one packet of the two packets by the time difference to calculate a channel capacity value;
   calculating an average channel capacity value based on a plurality of channel capacity values; and
   estimating the channel capacity based on a plurality of average channel capacity values,
   wherein the server transmits 'N' data packets to the terminal so that the plurality of channel capacity values are calculated from the 'N' packets, and the average channel capacity value is determined from the plurality of channel capacity values,
   wherein the 'N' packets comprises a plurality of two consecutively transmitted data packets of the same size.

5. The method of claim 4, further comprising:
   filtering a channel capacity value greater than a maximum data throughput per second in the HSDPA network, among the plurality of channel capacity values.

6. The method of claim 4, wherein the maximum data throughput per second is 1.8 Mbps.

7. A terminal enabling channel capacity estimation in an HSDPA network, comprising:
   a receiver configured to receive two data packets of the same size that are consecutively transmitted via a channel without causing time latency;
   a time difference measuring unit configured to measure a received time difference between the two received packets;
   a channel capacity calculator configured to divide the length of any one packet of the two packets by the time difference and thereby calculate a channel capacity value, and to calculate an average channel capacity value based on a plurality of channel capacity values; and
   a channel capacity estimator configured to estimate the channel capacity based on a plurality of average channel capacity values,
   wherein a server transmits 'N' packets to the terminal so that the plurality of channel capacity values are calculated from the 'N' packets, and the average channel capacity value is determined from the plurality of channel capacity values,
   wherein the 'N' packets comprises a plurality of two consecutively transmitted data packets of the same size.

8. The terminal of claim 7, further comprising:
   a filter configured to filter a channel capacity value greater than a maximum data throughput per second in the HSDPA network, among the plurality of channel capacity values.

9. A server enabling channel capacity estimation in an HSDPA network, comprising:
   a transmitter configured to consecutively transmit two data packets of the same size via a channel without causing time latency;
   a receiver configured to receive, from a terminal that receives the two packets, information associated with a time difference between the two received packets;
   a channel capacity calculator configured to divide the length of any one packet of the two packets by the time difference and thereby calculate a channel capacity value, and to calculate an average channel capacity value based on a plurality of channel capacity values; and
   a channel capacity estimator configured to estimate the channel capacity based on a plurality of average channel capacity values,
   wherein the server transmits 'N' data packets to the terminal so that the plurality of channel capacity values are calculated from the 'N' packets, and the average channel capacity value is determined from the plurality of channel capacity values,
   wherein the 'N' packets comprises a plurality of two consecutively transmitted data packets of the same size.

10. The server of claim 9, further comprising:
    a filter configured to filter a channel capacity value greater than a maximum data throughput per second in the HSDPA network, among the plurality of channel capacity values.

* * * * *